(12) United States Patent
Larose, Jr. et al.

(10) Patent No.: US 8,359,828 B2
(45) Date of Patent: Jan. 29, 2013

(54) PARTICULATE FILTER TEMPERATURE CORRECTION SYSTEM AND METHOD

(75) Inventors: Thomas Larose, Jr., Redford, MI (US); Rebecca J Darr, Milford, MI (US)

(73) Assignee: GM Global Technology Operations LLC

( * ) Notice: Subject to any disclaimer, the term of this patent is extended or adjusted under 35 U.S.C. 154(b) by 555 days.

(21) Appl. No.: 12/396,958

(22) Filed: Mar. 3, 2009

(65) Prior Publication Data

US 2010/0223912 A1 Sep. 9, 2010

(51) Int. Cl.
*F01N 3/00* (2006.01)

(52) U.S. Cl. .............. 60/285; 60/274; 60/297; 60/311

(58) Field of Classification Search .............. 60/274, 60/276, 295, 297, 311, 277, 285
See application file for complete search history.

(56) References Cited

U.S. PATENT DOCUMENTS

| | | | |
|---|---|---|---|
| 5,884,477 A | 3/1999 | Andou et al. | |
| 7,347,043 B2 * | 3/2008 | Tahara et al. | 60/297 |
| 7,421,838 B2 * | 9/2008 | Nakano | 60/295 |
| 7,640,729 B2 * | 1/2010 | Durnholz et al. | 60/289 |
| 2007/0006574 A1 | 1/2007 | Nakano | |

FOREIGN PATENT DOCUMENTS

| | | |
|---|---|---|
| CN | 1891987 A | 1/2007 |
| DE | 102005061548 A1 | 7/2007 |
| EP | 1741907 (A2) | 1/2007 |

OTHER PUBLICATIONS

Office Action dated Jul. 26, 2012 from the German Patent Office for German Patent Application No. 10 2010 008 589.8, 7 pages.

* cited by examiner

*Primary Examiner* — Thomas Denion
*Assistant Examiner* — Diem Tran

(57) ABSTRACT

A method and system of controlling an engine includes a control system includes an exhaust gas flow rate module generating an exhaust gas flow rate signal corresponding to a flow rate of exhaust gases. The control system further includes a temperature adjustment module that determines a temperature correction factor based on the exhaust gas flow rate and that determines a corrected temperature particulate sensor signal in response to a measured particulate temperature signal and the temperature correction factor.

20 Claims, 3 Drawing Sheets

US 8,359,828 B2

PARTICULATE FILTER TEMPERATURE CORRECTION SYSTEM AND METHOD

FIELD

The present disclosure relates to vehicle exhaust systems, and more particularly to diagnosing operation of an exhaust treatment system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

More and more exhaust hardware technology is being added to meet emissions on diesel applications. After treatment of exhaust gases includes the installation of multiple bricks, mixers and injectors for the exhaust stream. Because of the additional exhaust gas components, the flow is mixed in the exhaust conduits. Depending on the packaging, the aftertreatment components allow the exhaust gases to swirl within the exhaust gas system. Sensors are typically placed in the exhaust gas system to provide feedback for various types of engine controls. Because of the swirling, differences in the readings for temperature sensors of a diesel particulate filter, for example, may not be accurate. Inaccurate readings of the temperature of the diesel particulate filter may lead to damage of the diesel particulate filter or not allow the diesel particulate filter to change the exhausted emission as designed.

SUMMARY

Accordingly, the present disclosure provides for a system and method for accurately determining the temperature of a diesel particulate filter based upon the exhaust flows. The amount of correction may vary depending upon the exhaust gas flow.

In one aspect of the disclosure, a control system includes an exhaust gas flow rate module generating an exhaust gas flow rate signal corresponding to a flow rate of exhaust gases. The control system further includes a temperature adjustment module that determines a temperature correction factor based on the exhaust gas flow rate and that determines a corrected temperature particulate sensor signal in response to a measured particulate temperature signal and the temperature correction factor.

In another aspect of the disclosure, a method includes generating an exhaust gas flow rate signal corresponding to a flow rate of exhaust gases, determining a temperature correction factor based on the exhaust gas flow rate and controlling an engine function in response to the temperature correction factor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
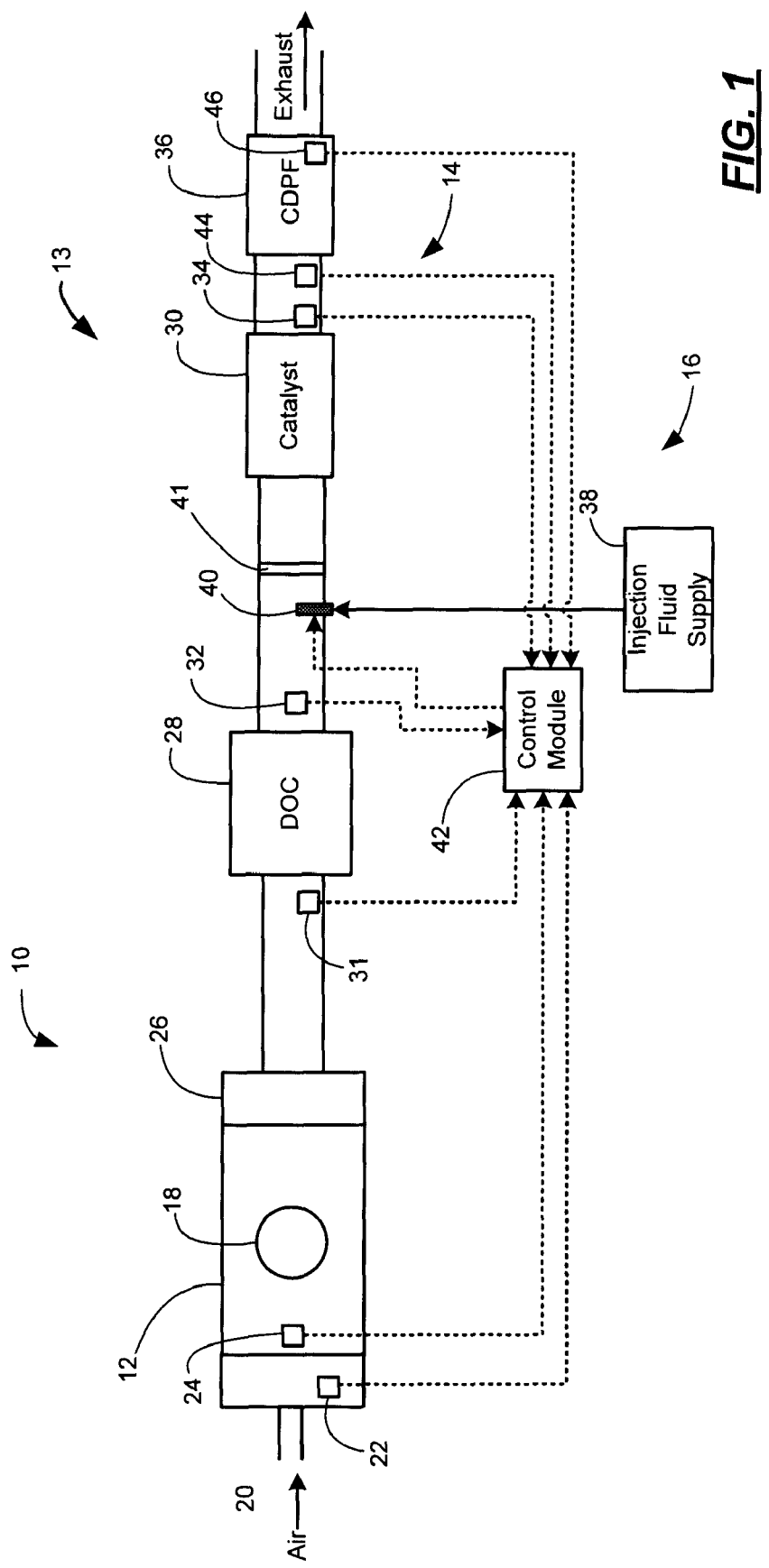
FIG. 1 is a functional block diagram of an engine system including an exhaust treatment system with temperature sensors integrated within a catalyst according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the following disclosure is set forth for diesel engines, other types of engines such as gasoline engines, including direct injection engines, may benefit from the teachings herein.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, preferably a selective catalyst reducing (SCR) catalyst, a temperature sensor 31, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 18. The inlet temperature sensor 32 is located prior to the catalyst 30 to monitor the temperature change at the inlet of the catalyst 30, as discussed further below. The outlet temperature sensor 34 is located after the catalyst to monitor the temperature change at the outlet of the catalyst 30, as discussed further below. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates and controls the operation of the engine system 10 and monitors operation of the dosing system 16.

An exhaust gas flow rate sensor 44 may generate a signal corresponding to the flow of exhaust in the exhaust system. Although the sensor is illustrated between the catalyst 30 and the CDPF 36 various locations within the exhaust system may be used for measurement including after the exhaust manifold and before the catalyst 30.

A temperature sensor 46 generates a particulate filter temperature sensor signal that corresponds to a measured particulate filter temperature. The temperature sensor 46 may be disposed on or within the diesel particulate filter 36. The temperature sensor 46 may also be located just after or just before the diesel particulate filter relative to the exhaust stream. The temperature sensor 46 communicates a measured particulate filter temperature signal to the control module 42.

Figure 2:
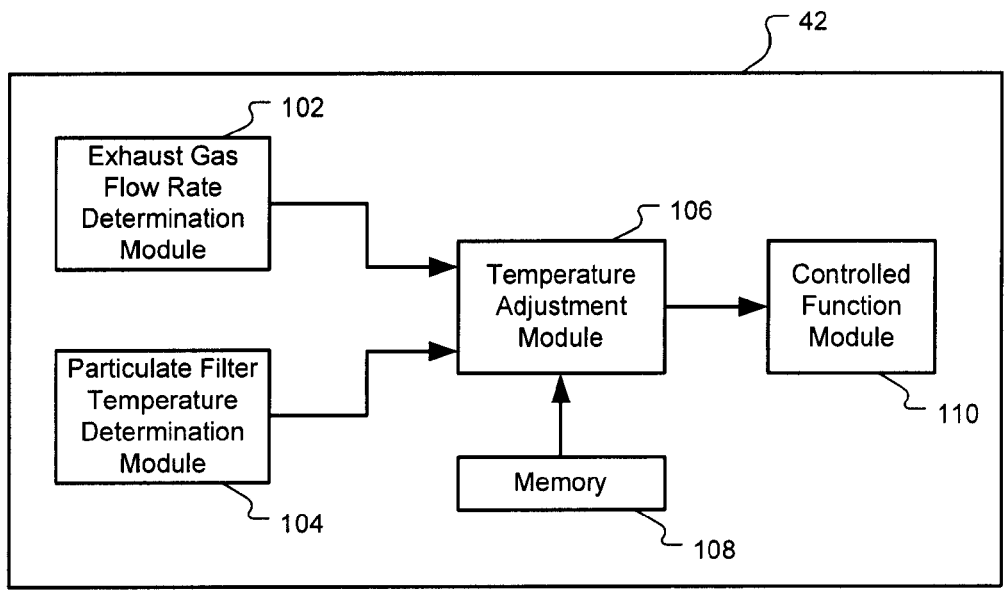
FIG. 2 is a functional block diagram of the controller of FIG. 1.

Referring now to FIG. 2, the control module 42 of FIG. 1 is illustrated in further detail. The control module 42 may include an exhaust gas flow rate determination module 102. The exhaust gas flow rate determination module may be in communication with the exhaust gas flow sensor 44 illustrated in FIG. 1. The exhaust gas flow rate determination module 102 may convert the exhaust gas flow rate signal from the sensor 44 into a form usable by the rest of the control module 42.

The control module 42 may also include a particulate filter temperature determination module 104. The particulate filter temperature module 104 may be in communication with the temperature sensor 46 located in or near the diesel particulate filter 36 of FIG. 1. The particulate filter temperature determination module 104 may convert the temperature sensor signal 46 into a form usable by the rest of the control module 42.

A temperature adjustment module 106 is in communication with the exhaust gas flow rate determination module 102 and the particulate filter temperature determination module 104. Based upon the exhaust gas flow rate, a correction factor may be determined. A correction factor may correspond directly to the exhaust gas flow rate 102. The temperature correction factor corresponding to the exhaust gas flow rate may be calibrated during engine development. The correction factor may vary depending on the exhaust gas flow rate. At low exhaust gas flows higher correction values may be needed. In one tested vehicle, the diesel particulate filter was 55 degrees hotter than a temperature sensor located within the diesel particulate filter. At a high exhaust rate, there was only a 15 degree offset. Thus, based upon the exhaust gas flow rate a lookup table of a proper correction factor corresponding to the flow rate may be determined. The temperature adjustment may provide a correction factor directly to the temperature determination module. This may be performed prior to the controlled function module 110. Various functions in the engine may be controlled by the temperature of the diesel particulate filter which is obtained in the temperature adjustment module 106. The controlled function module 110 may also directly receive a correction factor which can be added to downstream calculations without adding the correction factor directly to the particulate filter measurement.

Figure 3:
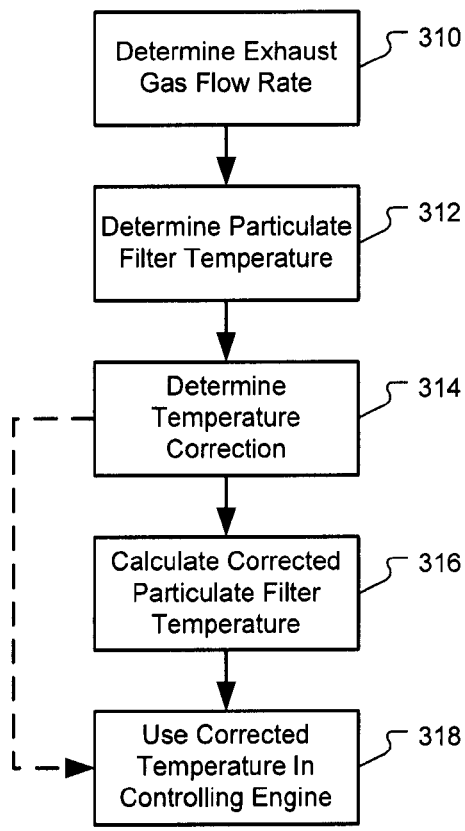
FIG. 3 is a flowchart illustrating steps executed by the system according to the present disclosure.

Referring now to FIG. 3, a method performed by the control module 42 is set forth in further detail. In step 310, the exhaust gas flow rate is determined. The exhaust gas flow rate may be determined from an exhaust gas flow rate sensor within the exhaust stream of the vehicle. Again, although diesel is provided in this example, gasoline or other types of fuels may be used.

In step 312, the particulate filter temperature is determined or measured. The particulate filter temperature may be determined from a temperature sensor located directly within the diesel particulate filter or in front of or behind the diesel particulate filter relative to the exhaust flow.

In step 314, the temperature correction factor may be determined based upon the exhaust gas flow rate. In step 316, a corrected particulate filter temperature 316 may be calculated from the combination of the temperature correction factor of step 314 and the particulate filter temperature 312.

In step 318, the corrected temperature is used for controlling various functions in the engine.

As mentioned above, a corrected particulate filter temperature may never be determined. Rather, the temperature correction factor may be communicated directly to formulas using the particulate filter formula and combined within a calculation therein. This is illustrated by the dotted lines between steps 314 and 318.

Figure 4:
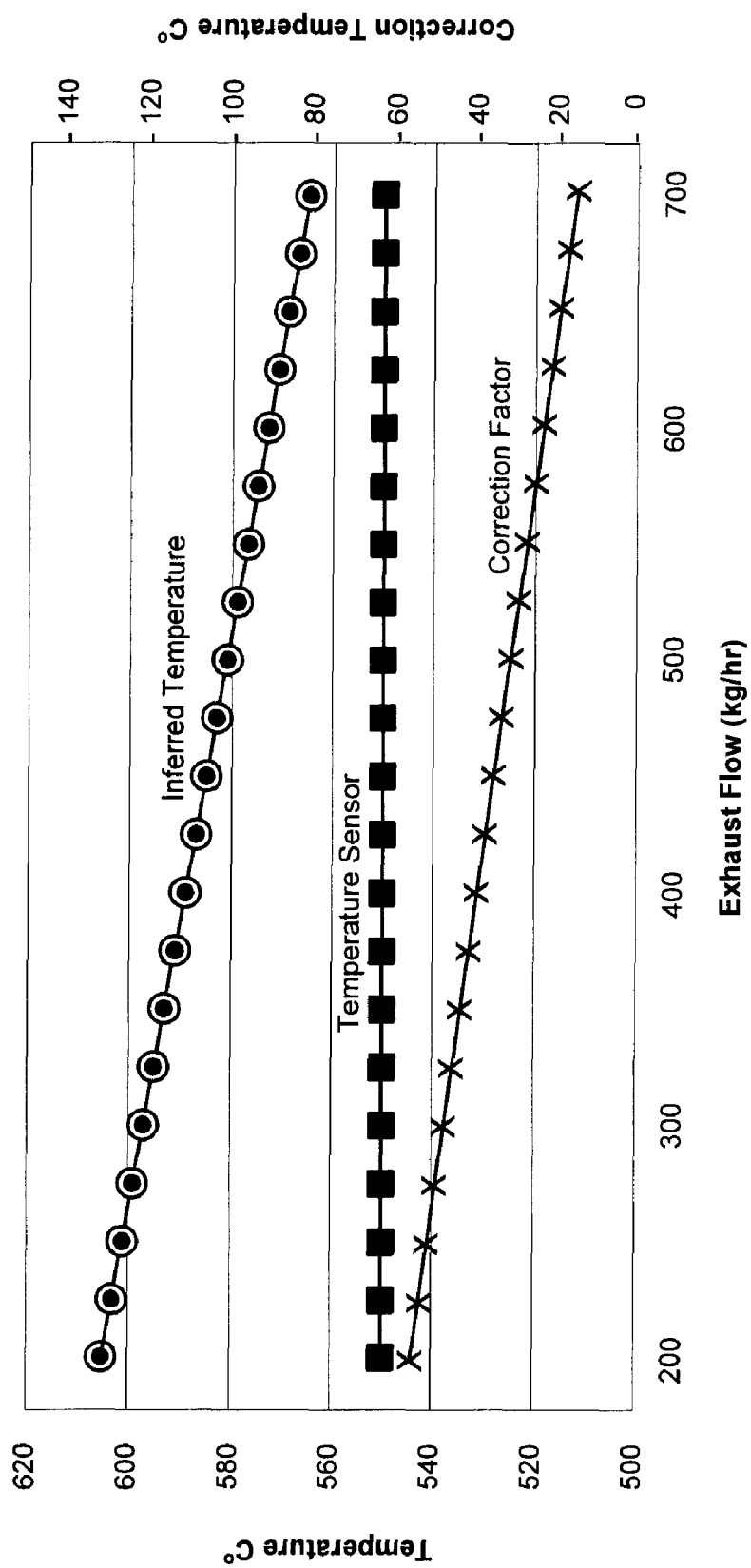
FIG. 4 is plot of temperatures versus exhaust flow rates including the temperature correction factor according to the present disclosure.

Referring now to FIG. 4, a plot of a temperature sensor signal is illustrated relative to the exhaust flow. The temperature sensor signal corresponds to a temperature sensor that is located within or directly adjacent to the diesel particulate filter. The temperature sensor signal, as is illustrated, is at about 550 degrees Celsius and is constant over various exhaust flows. However, it has been found that the temperature signals were offset by the correction factor. The temperature correction factor changes with the exhaust flow rate. At lower exhaust flow rates a higher temperature correction factor is used and at higher exhaust flow rates a lower correction factor is used. By adding the temperature correction factor to the temperature sensor signal the inferred temperature of the particulate filter, which is also illustrated, is obtained. Experimentally, it was determined that the correction factor is the proper amount of correction to obtain the actual diesel particulate filter sensor signal. It should be noted that the correction factor axis is illustrated on the right-hand side of the diagram labeled correction factor temperature whereas the inferred temperature and the temperature sensor signal corresponds to the left axis. By instrumenting the diesel particulate filter, it was found that the inferred temperature corresponds directly to the actual diesel particulate filter temperature.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A control system comprising:
an exhaust gas flow rate module generating an exhaust gas flow rate signal corresponding to a flow rate of exhaust gases; and
a temperature adjustment module that determines a temperature correction factor based on the exhaust gas flow rate and that determines a corrected particulate filter temperature sensor signal based on a sum of a measured particulate filter temperature signal and the temperature correction factor, wherein the temperature correction factor is inversely related to the exhaust gas flow rate.

2. A control system as recited in claim 1 wherein the control system comprises a controlled function module controlling an engine function in response to the corrected particulate filter temperature sensor signal.

3. A control system as recited in claim 1 further comprising a memory in communication with the temperature adjustment module.

4. A control system as recited in claim 3 wherein the memory comprises a look up table for determining the temperature correction factor.

5. A control system as recited in claim 1 further comprising a diesel engine.

6. A control system as recited in claim 5 wherein the control system comprises a controlled function module controlling an engine function for the diesel engine in response to the corrected particulate filter temperature sensor signal.

7. A control system as recited in claim 1 further comprising a particulate filter temperature sensor generating the measured particulate filter temperature signal corresponding to a particulate filter temperature.

8. A control system as recited in claim 7 further comprising a controlled function module controlling an engine function in response to the corrected particulate filter temperature sensor signal.

9. A control system as recited in claim 8 wherein the controlled function module controls the engine function in response to the temperature correction factor and the measured particulate filter temperature signal.

10. A control system as recited in claim 7 wherein the particulate filter temperature sensor is disposed within a particulate filter.

11. A control system as recited in claim 7 wherein the particulate temperature sensor is disposed adjacent to a particulate filter.

12. A control system as recited in claim 7 wherein the particulate temperature sensor is disposed before a particulate filter.

13. A method comprising:
generating an exhaust gas flow rate signal corresponding to a flow rate of exhaust gases;
determining a temperature correction factor based on the exhaust gas flow rate; and
determining a corrected particulate filter temperature sensor signal based on a sum of a measured particulate filter temperature signal and the temperature correction factor, wherein the temperature correction factor is inversely related to the exhaust gas flow rate.

14. A method as recited in claim 13 further comprising generating the measured particulate filter temperature signal corresponding to a particulate filter temperature.

15. A method as recited in claim 13 further comprising controlling an engine function in response to the corrected particulate filter temperature sensor signal.

16. A method as recited in claim 15 wherein controlling an engine function comprises controlling the engine function in response to the particulate filter temperature signal.

17. A method as recited in claim 15 wherein controlling the engine function in response to the particulate filter temperature signal comprises controlling the engine function in response to the particulate filter temperature signal from a particulate filter temperature sensor disposed in an exhaust system of a diesel engine.

18. A method as recited in claim 15 wherein generating an exhaust gas flow rate signal comprises generating the exhaust as flow rate signal corresponding to the flow rate of exhaust gases from a diesel engine.

19. A method as recited in claim 15 wherein determining the correction factor comprises determining the correction factor from a lookup table.

20. A method as recited in claim 15 wherein controlling an engine function comprises controlling the engine function for a diesel engine.

* * * * *